UNITED STATES PATENT OFFICE.

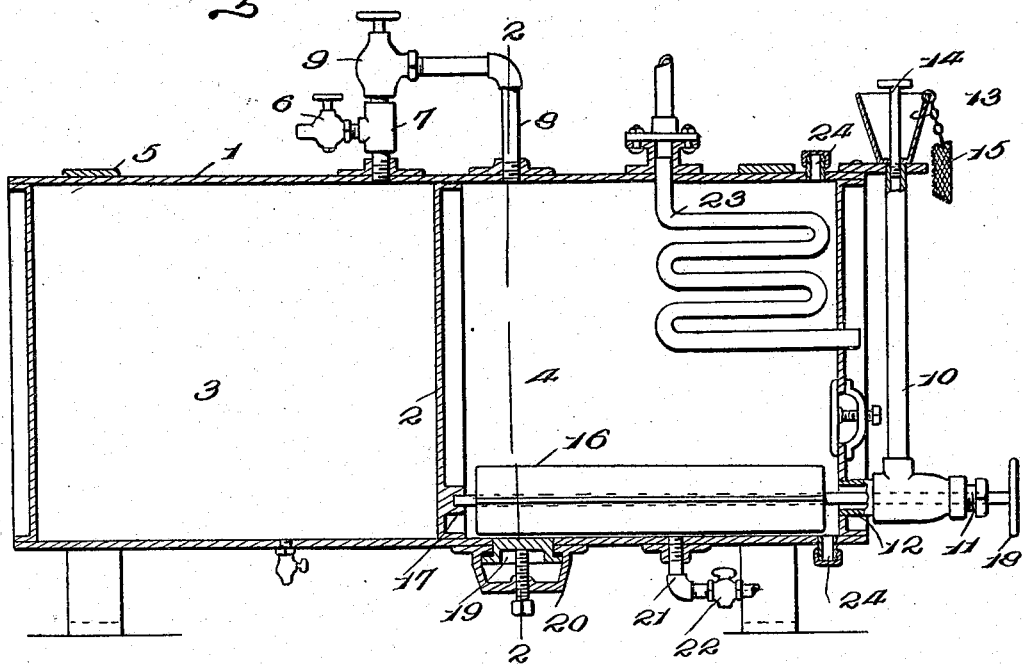
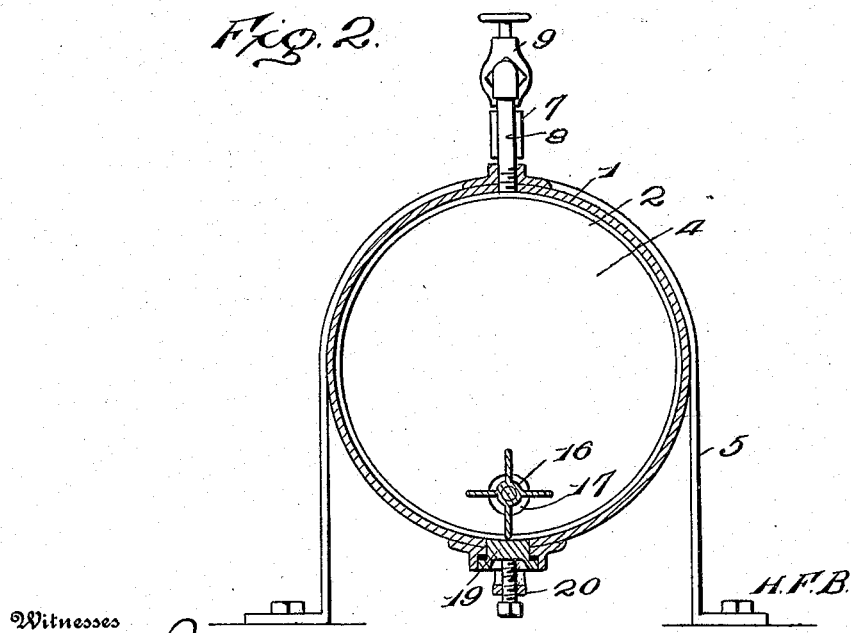

HILLDRETH F. B. SNYDER, OF HOOD RIVER, OREGON.

SPRAYING APPARATUS.

No. 930,627.  Specification of Letters Patent.  Patented Aug. 10, 1909.

Application filed March 31, 1908. Serial No. 424,445.

*To all whom it may concern:*

Be it known that I, HILLDRETH F. B. SNYDER, a citizen of the United States, residing at Hood River, in the county of Wasco and State of Oregon, have invented certain new and useful Improvements in Spraying Apparatus, of which the following is a specification.

This invention relates to spraying apparatus designed for use with insecticide or germicide or other powdered or liquid substances, for the purpose of spraying plants or trees, or for any other purpose, and designed to have air under pressure admitted thereto, so that it may be used to give off the fluid or powdered spray through suitable nozzles.

The primary object of the invention is an improved construction of apparatus of this character, which embodies two tanks, one of which is designed to receive the spraying material or substance, and the other of which is designed to be stored with air under pressure, there being a suitable controlling connection between the two tanks, so that, after the supply of insecticide or the like has become exhausted from one tank, this connection may be cut off, and such tank re-charged without unnecessarily expending or exhausting the air or fluid under pressure in the other tank.

With this and other objects in view, that will more fully appear as the description proceeds, the invention consists in certain constructions and arrangements of the parts that I shall hereinafter fully describe and claim.

For a full understanding of the invention and the merits thereof, reference is to be had to the following description and accompanying drawing, in which:

Figure 1 is a longitudinal sectional view of my improved spraying apparatus; and, Fig. 2 is a transverse section thereof, on the line 2—2 of Fig. 1.

Corresponding and like parts are referred to in the following description and indicated in all the views of the drawing by the same reference characters.

Referring to the drawing, the numeral 1 designates a preferably cylindrical drum which may be made of boiler plate or other suitable metal, and which is divided by a partition 2 so as to produce two distinct tanks 3 and 4, one of said tanks being designed to contain an insecticide or the like, and the other being intended for air or other motive fluid under pressure.

5 designates straps or bands secured to the ends of the drum 1, so that it may be secured properly upon a truck or the like, and carried from place to place as necessary.

The tank 3 is provided with an air inlet or cock 6 designed to be secured to an air pump or compressor of any desired construction (not shown), said cock 6 being secured in a union coupling 7 which is secured to the body portion of the tank 3, as shown, and which is connected by pipes and elbow couplings 8 to the other tank 4. In this connection, there is a globe or other valve 9 which may be closed or opened by hand, so as to establish or cut off the communication between the tanks 3 and 4.

To that end of the drum 1 which constitutes a portion of the magazine or tank for the spraying materials, a filling tube 10 is connected, the lower end of this tube being attached to a T coupling 11, one branch of which is secured to a nipple 12 projecting from the end of the drum near the bottom thereof. The upper end of this filling tube 10 is provided with a funnel 13, into which the materials may be poured, and said funnel is closed by means of a screw plug with an elongated handle 14 extending up out of the funnel, so that it may be conveniently manipulated.

15 designates a strainer which is attached to the funnel by a chain or the like, as shown, and which may be inserted into the funnel to strain the materials as they are poured into the filling tube. An agitator 16, with any desired number of paddles or blades, is mounted in the bottom of the tank 4, and extends longitudinally thereof, the shaft upon which said agitator is mounted, being journaled at one end in a bracket 17 next to the partition 2, and being journaled at its other end in a stuffing box in the T coupling 11. One end of this shaft projects out from the T coupling 11, and is provided with a wheel 18, by which it may be turned by hand or other power.

19 designates a closure held against an opening in the bottom of the tank 4 by means of a yoke and screw bolt 20, and designed to be opened for any desired purpose, so as to serve as a manhole.

21 designates an outlet pipe which is designed to lead to one or more spraying tubes (not shown), for the purpose of conveying the insecticide, or the like, under pressure, in the form of spray, to the trees or shrubs or other objects to be sprayed. This pipe 21 is provided, at a suitable point in its length, with a pet cock 22, which may be opened to drain the tank 4.

23 designates a coil or worm within the tank 4, and designed to be connected to a steam pipe, so as to circulate steam through the tank, for the purpose of boiling or heating the ingredients therein.

24 designates nipples that are designed to have injectors secured thereto, in order to re-charge the chamber 4 with spray or other fluid, so as to utilize the accumulated air or other pressure contained therein, which otherwise would be wasted.

In the practical use of my improved spraying apparatus, the tank 4 is first filled with liquid or powdered insecticide or the like, the valve 9 is closed, and the tank 3 is then charged with air or the like under pressure, to a predetermined degree. The valve 9 is then opened, the pressure being then directed into the tank 4, and the materials in such last named tank being discharged therefrom in the form of spray. When the tank 4 is empty, the valve 9 is closed. At this point, it will be clearly understood that the tank 3 will be found to have lost some of its pressure, and it will also be found that there remains considerable pressure in the tank 4. By letting the accumulated pressure in the tank 4 out through any injector suitable for the purpose, the tank 4 may be then re-charged with the desired material, through the action of the pressure in said tank, which would otherwise be wasted. At this time, it will then be apparent that the tank 4 is re-charged, and that there is also considerable pressure under control in the other tank 3. Hence it will be seen that by increasing the pressure in the tank 3, the original or predetermined degree of pressure may be restored, the apparatus in its entire operation avoiding the unnecessary expenditure of any air pressure in either of the two tanks, while re-charging the tank 4 with another supply of the insecticide or germicide.

From the foregoing description, in connection with the accompanying drawing, it will be seen that I have provided a very simple, durable and efficient construction of spraying apparatus of this character, which may be operated with a minimum expenditure of air or the like under pressure, owing to the arrangement of the parts hereinbefore set forth.

Having thus described the invention, what I claim is:

1. A spraying apparatus, comprising a tank for the materials to be sprayed, means for supplying said tank with air under pressure, a filling tube for the purpose of supplying said tank with the materials, means secured to the tank for holding the filling tube at its upper end, a T-coupling secured to the filling tube at its lower end and connected to the tank, an agitator mounted in the tank and embodying a rotatable shaft journaled at one end in the tank and having its other end to pass outwardly through the inlet opening of the tank and journaled in and extending out through the T-coupling, whereby the turning of the shaft will serve to maintain the inlet opening of the tank clear of any accumulation of sediment, the tank being formed with a discharge opening underneath and in proximity to the agitator whereby the rotation of the agitator will also serve to clear any sediment away from the discharge opening.

2. A spraying apparatus, comprising a drum provided between its ends with a transverse partition producing on opposite sides of the partition two distinct tanks, a connection between said tanks, means for supplying one of the tanks with compressed air, an agitator mounted in the other tank and embodying a series of blades and a shaft carrying said blades, the shaft being journaled at one end in the partition and the said tank being formed with a manhole underneath the agitator and in proximity to the partition, a filling tube, the last named tank being formed with an inlet opening with which said filling tube communicates, the shaft of the agitator passing outwardly through the inlet opening of such tank, and a T-coupling in which said shaft is journaled, said coupling forming the connection between the filling tube and the tank.

In testimony whereof I affix my signature in presence of two witnesses.

HILLDRETH F. B. SNYDER. [L. S.]

Witnesses:
J. F. REYNOLDS,
J. M. CULBERTSON.